(12) United States Patent
Weber et al.

(10) Patent No.: US 10,891,776 B2
(45) Date of Patent: Jan. 12, 2021

(54) IMAGING SYSTEM AND METHOD

(71) Applicant: KONINKLIJKE PHILIPS N.V., Eindhoven (NL)

(72) Inventors: Frank Michael Weber, Hamburg (DE); Niels Nijhof, Best (NL); Irina Waechter-Stehle, Hamburg (DE); Juergen Weese, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 90 days.

(21) Appl. No.: 16/088,466

(22) PCT Filed: Mar. 22, 2017

(86) PCT No.: PCT/EP2017/056749
§ 371 (c)(1),
(2) Date: Sep. 26, 2018

(87) PCT Pub. No.: WO2017/174351
PCT Pub. Date: Oct. 12, 2017

(65) Prior Publication Data
US 2019/0096118 A1   Mar. 28, 2019

(30) Foreign Application Priority Data

Apr. 4, 2016   (EP) .................................... 16163623

(51) Int. Cl.
*G06T 15/00* (2011.01)
*G06T 15/08* (2011.01)
(Continued)

(52) U.S. Cl.
CPC ............ *G06T 15/08* (2013.01); *G06T 7/0012* (2013.01); *G06T 7/11* (2017.01); *G06T 7/149* (2017.01);
(Continued)

(58) Field of Classification Search
CPC ....... G06T 15/08; G06T 7/0012; G06T 7/149; G06T 7/11; G06T 2207/10072;
(Continued)

(56) References Cited

U.S. PATENT DOCUMENTS 5,971,767 A   10/1999 Kaufman et al.
6,083,162 A   7/2000 Vining
(Continued)

OTHER PUBLICATIONS

Ecabert et al "Automatic Model Based Segmentation of the Heart in CT Images" IEEE Transactions on Medical Imaging vol. 27, No. 9, Sep. 2008 p. 1189-1201.

*Primary Examiner* — Neil R Mclean

(57) ABSTRACT

The invention provides a 'model-based' imaging system in which surface values to be applied to a segmented surface of an imaged body are determined on the basis of projections cast into the volume of the imaged body, the projections made at angles and depths determined on the basis of information encoded within an anatomical model. In examples, the angles and depths are determined on the basis of a comprehensive segmentation of the imaged body, itself performed on the basis of the anatomical model. By locally varying projection angles and depths around the body, in dependence upon local anatomical context, improved imaging of the internal structure of the imaged body may be achieved. In particular, images may be generated providing representations of the internal structure which are of greater clinical utility or relevance. 4D data sets may also be better handled, through use of anatomical context to maintain consistency in representations across multiple frames.

16 Claims, 4 Drawing Sheets

(51) Int. Cl.
    *G06T 7/149*     (2017.01)
    *G06T 7/00*     (2017.01)
    *G06T 7/11*     (2017.01)

(52) U.S. Cl.
    CPC ............... *G06T 2207/10072* (2013.01); *G06T 2207/10136* (2013.01); *G06T 2207/30048* (2013.01); *G06T 2210/41* (2013.01)

(58) Field of Classification Search
    CPC . G06T 2207/30048; G06T 2207/10136; G06T 2210/41
    See application file for complete search history.

(56) References Cited

U.S. PATENT DOCUMENTS

| | | |
|---|---|---|
| 7,233,329 B2 | 6/2007 | Moreau-Gobard |
| 8,605,096 B2 | 12/2013 | Visser |
| 8,723,866 B2 | 5/2014 | Buyanovskiy |
| 2004/0181151 A1 | 9/2004 | Sumanaweera et al. |
| 2005/0080328 A1* | 4/2005 | Vass ..................... A61B 5/0456 600/407 |
| 2005/0093861 A1* | 5/2005 | Moreau-Gobard ..... G06T 15/08 345/419 |
| 2009/0092303 A1* | 4/2009 | Griswold ............ G01R 33/5611 382/131 |
| 2010/0215238 A1* | 8/2010 | Lu ............................. G06T 7/12 382/131 |
| 2011/0103661 A1* | 5/2011 | Schummers ............ G06T 17/00 382/128 |
| 2013/0064440 A1* | 3/2013 | Wiemker ................ G06T 15/08 382/131 |
| 2013/0329980 A1* | 12/2013 | Pekar ........................ G06T 7/33 382/131 |
| 2016/0012636 A1* | 1/2016 | Lauritsch ............... A61B 6/504 345/420 |

\* cited by examiner

IMAGING SYSTEM AND METHOD

This application is the U.S. National Phase application under 35 U.S.C. § 371 of International Application No. PCT/EP2017/056749, filed on Mar. 22, 2017, which claims the benefit of EP Application Serial No. 16163623.8, filed Apr. 4, 2016. These applications are hereby incorporated by reference herein.

FIELD OF THE INVENTION

The invention relates to an imaging system comprising an image rendering means, and an imaging method.

BACKGROUND OF THE INVENTION

Various techniques exist for performing image rendering in real time imaging, for example ultrasound imaging. These methods include rendering of 2D cut slices or planes, or 3D volume rendering using ray-casting techniques. The disadvantage of 2D cut planes is that it is difficult to get a full three-dimensional understanding or impression of the data-set.

3D volume rendering techniques typically involve casting virtual rays into an imaged 3D volume to obtain a 2D projection of the data that can be displayed in a final rendered image. When rays are cast from a virtual observer's position towards a region of interest within an imaged object, various anatomic structures may be interposed along the way, which can block or otherwise interfere with obtaining a clear image of the region of interest.

One means of at least partially mitigating this problem is to perform segmentation of the 3D image data in advance of the 3D rendering, so as to section out one or more large portions of the volume which are considered uninteresting. This typically results in a smaller, shaped, segmented volume portion, delimited by a segmented surface or contour. Rays may then be cast from the viewer position, through the segmented surface, and into the volume delimited by it. Colour values to be applied to the segmented surface may then be determined on the basis of aggregated or composited shading or gradient-of-illumination values of sample points along the projected ray.

U.S. Pat. No. 7,233,329 B2 discloses one example of an image rendering method, which includes first segmenting image data to isolate the outer surface of an organ (e.g. the heart) and secondly, performing a maximum intensity projection (MIP) substantially normal to the segmented outer surface. MIP involves casting rays for each voxel on the segmented outer surface, each at an angle substantially perpendicular to the surface, and extending from a point within the organ volume to the respective voxel on the organ surface. The voxel of maximum intensity along the ray is displayed on the surface of the heart. It is disclosed that model-based segmentation may be used to isolate the heart.

However, one deficiency of this method is that the representation of the underlying volume which it produces may typically not be ideal from the point of view of clinical utility. By casting all rays at angles substantially perpendicular to the surface of the imaged organ, the view generated of any underlying anatomical structures may not provide the most geometrically faithful or clinically useful impression. Rather than obtaining a clear impression of underlying structures or features, one may typically expect somewhat distorted or otherwise imperfect representations of both the overall structure and any particular details which may be of particular clinical interest.

Furthermore, this approach is also very restricted when it comes to 4D imaging; generating representations reflecting multiple individual frames over time, for instance frames generated through real-time 3D imaging of anatomical bodies. In many cases, the body being imaged does not remain static over time, so that an anatomical structure or region of interest, lying within the segmented volume of the body, may shift position or change orientation between each individual frame. This results in a set of final rendered images in which the region of interest, as projected onto the segmented surface, appears to move and/or to change apparent shape or outline due to the shift in orientation of a typically non-symmetric body or region of interest.

SUMMARY OF THE INVENTION

The inventors have recognised a need therefore for an imaging system and method for generating rendered images from a 3D data-set which is able to both more faithfully represent the appearance of one or more anatomical objects or regions of interest lying within the imaged volume and which is able to maintain consistency in these representations, in terms for example of apparent orientation or position, across multiple time-separated frames.

The invention is defined by the claims.

According to an aspect of the invention, there is provided an imaging system comprising:

an input unit adapted to receive 3D image data of a volume of an object to be imaged;

a segmentation unit adapted to perform segmentation of the 3D image data received by the input unit, the segmentation being based upon an anatomical model and configured to determine at least one segmented surface within the 3D image data;

a surface rendering unit, adapted to generate one or more surface values to be assigned to points on the at least one segmented surface, said values being based upon image data values of the 3D image data falling along projection vectors extended through said points, each projection vector having length and/or angle to the segmented surface determined at least partly on the basis of the the anatomical model; and an image rendering unit adapted to generate one or more images of the object to be imaged based upon the surface values generated by the surface rendering unit.

Embodiments of the invention are based upon utilisation of local anatomical information of the imaged region, obtained by means of an anatomical model, to locally adjust the depth or angle of penetration of projection vectors cast through a first segmented surface isolated within the imaged region, into (or out of) the sub-volume of the imaged region delimited by the segmented surface. The projection vectors, or 'sampling rays', extend at least (and may, in some examples, extend at most) between a point on the segmented surface and a second respective point within the volumetric sub-region. Surface values to be applied to said points of penetration on the segmented surface are determined on the basis of image data values falling substantially along the length of respective projection vectors. The image data values may be composited to form a surface value. The surface values together form a projection or representation of the volumetric sub-region beneath.

One or more of said surface values may in examples be generated through compositing all of the image data values falling along the length of the respective projection vector, or may alternatively be generated through compositing just a selection or subset of the image data values falling along the length. For example, a surface value may be calculated or determined on the basis of compositing image data values falling along only one section or stretch of the length of the vector, discounting image data values along remaining length sections. To take one illustrative example, a projection vector might extend from a point on the surface to a point 5 mm above the surface. The point of intersection with the surface may in this case be assigned a surface value based on a compositing of image data values falling along the whole length of the projection vector, or might instead be assigned a value based on image data values falling along only a stretch of the vector, for instance a stretch extending between 5 mm and 2 mm above the surface.

By 'along the length of' is meant substantially along the length of. This may include for instance image data values falling within a certain radial periphery or radially extending region of a given projection vector. By 'along' is meant broadly in the vicinity of, and does not necessarily imply that only values directly intersected by the projection vector are composited to form the final shading value.

The angles at which the various projections are cast into the segmented volume determines the particular view of any underlying anatomical features or structures embodied within the volume that is produced on the surface. The depth to which the projections are cast may determine the portion of the volume that is imaged on the surface. Embodiments of the invention are based on defining these angles and/or depths in dependence upon information contained within an anatomical model, so as for instance to acquire the best (for example most clinically useful) view or impression of the features and structure of the volume being imaged.

Particular examples may include more or less complex approaches to defining the projection vectors. In the simplest case, the surface rendering unit may be adapted to construct the projection vectors according to a pre-determined pattern or arrangement in which each vector is assigned one of a set of pre-determined angles and depths based upon the particular location of the point on the segmented surface through which the vector is to extend. These angles and depths may be encoded as part of the anatomical model for instance. The pre-determined values may vary in a way which aims to take account of the anatomical features of the body or volume being imaged for example. In this case therefore, the lengths and/or angles of the projection vectors may be determined predominantly on the basis of the anatomical model.

The angles and/or depths may be pre-determined in a way that takes account of anatomical features and structures within the sub-volume, and be configured so as in most cases to produce a set of surface values which best capture the anatomical details of the body being imaged.

In more complex examples, the lengths and/or angles of the projection vectors may be determined at least partly on the basis of the segmentation of the image data. In some cases, the segmentation unit may be configured, for each individual image, to comprehensively segment the sub-volume delimited by the first segmented surface, based upon the anatomical model, and thereby generate image-specific anatomical information concerning the locations and/or dimensions of one or more anatomical features or structures within the sub-volume. This image-specific anatomical information may then be utilised by the surface rendering unit in determining the angles and/or depths at or to which the projections are cast, so as for example to obtain an optimal view of the anatomical features lying within the delimited sub-volume. In these examples therefore, the length and/or angle of the projection vectors is determined at least partly on the basis of the segmentation. Since the segmentation is itself determined on the basis of the anatomical model, the projection vectors are still in this case determined on the basis of the anatomical model.

Furthermore, in the case of 4D image data, comprising multiple image frames captured at different times, such local anatomical information may be generated for each and every frame, by, in at least some embodiments, segmenting each and every frame based upon the anatomical model, in advance of rendering images for said frames. This may enable a consistent view (in terms for example of position or orientation within the rendered images) of a particular anatomical feature lying within the volume to be captured across all of the frames, even in the case that said feature moves, shifts, expands or contracts in-between two or more frames. The angles and/or depths of the projections may accordingly be adjusted to take account of these shifts.

Such 4D stabilisation may also be achieved by the more simple embodiment described above, by encoding the pre-determined angles and depths to have some time-dependency, so that the angles and depths may change (in a pre-determined way) between different frames. This may require some further initial image-analysis step for each frame, to determine at which point in a typical time-cycle of expected movement the frame lies. Once this is determined, the correct set of pre-determined vectors may immediately be applied.

In accordance with examples, the process of defining the projection vectors based upon the segmentation and/or anatomical model may be such that at least a subset of the projection vectors are defined having an angle non-orthogonal to the at least one segmented surface.

According to one or more examples, the surface values generated by the surface rendering unit may comprise one or more of: colour values, shading values, texture values or intensity values.

The anatomical model may for example comprise data or information representing one or more of the structure, shape, density or texture of one or more volumetric regions or areas of a human or animal body. It may comprise for example information or data relating to or representing the locations of one or more anatomical features within one or more areas of the human or animal body. The model may include information concerning locations and/or physical or material properties of boundaries between various anatomical structures and/or features within the modelled area or region. It may include information or data representing the physical properties or material composition of regions covered by the model.

As discussed above, the model may further comprise anatomically linked data or information to be used as inputs to the image rendering system. For example, the model may include data representing one or more sets of pre-defined projection vectors, where each projection vector is linked or assigned to a particular location on an anatomical surface which is encoded within the model.

The model may comprise data being represented by any form of data structure, such as, by way of non-limiting example, a table, data list or array.

In examples, the model may comprise data represented by a graphical representation such a graph, chart, map, plan, plot or diagram.

The model may, for example, comprise data representing a scalar or vector field representing values of one or more physical quantities or properties across the anatomical region covered by the model.

The anatomical model enables image data representing a volumetric region of the human or animal body to be segmented so as to isolate a volumetric sub-region within the image data which is of anatomical significance or interest. This volumetric sub-region is the region delimited, defined or bound by the segmented surface. For example, the model may enable image data representing a patient's chest area to be segmented, so as to isolate only the data representing the volumetric region occupied by the heart. The segmented surface determined by the segmentation unit is in this case the outer surface of the heart. In an alternative example, the image data may cover the heart, and the segmentation may enable isolation of volume data representing just one or more arteries, chambers or other anatomical features of the heart.

The anatomical model may further enable comprehensive segmentation of one or more areas of the anatomical region covered by the model, for example at least the sub-volume delimited by the first segmented surface determined by the segmentation unit. This may be such as to enable image-specific anatomical information concerning the locations and/or dimensions of one or more anatomical features or structures within the sub-volume to be generated for use by the surface rendering unit.

In examples, the respective units forming the imaging system may be physically distinct entities, or may be purely notionally or functionally distinct entities. Two or more of the units may be comprised or embodied by a single electrical or computational component for example.

In accordance with one or more embodiments, at least a subset of the projection vectors may each extend between a respective point on the at least one segmented surface and a respective point within the imaged volume, said respective point within the imaged volume being selected by the surface rendering unit at least partly on the basis of the segmentation, the anatomical model and/or on the basis of user input commands.

According to these examples, said subset of the projection vectors each extend from a point on the first segmented (isolated) surface referred to above, to a point within the image data. In examples, this may be a point within the sub-volume delimited by said isolated surface. However, according to other examples, this end point may be a point outside of the sub-volume delimited by the first segmented (isolated) surface.

The end point of the projection vector may be determined by the surface rendering unit at least partly on the basis of the segmentation performed by the segmentation unit. As described above, the segmentation unit may be configured to comprehensively segment the sub-volume delimited by the isolated surface so as to identify locations and dimensions of anatomical features or bodies lying within. This information may then be used in determining the end-point to which each projection vector is extended. Each end point may be made to coincide for instance with some clinically relevant feature of an anatomical structure or body lying within the sub-volume, for instance a boundary comprising part of the structure or body.

The end point may additionally or alternatively be determined at least partly on the basis of user input commands. User input commands may be provided by means of an external user interface unit, not part of the imaging system 10, but in operative communication with the imaging system for example. Alternatively, a user interface unit may be provided as a part of the system. A user interface unit may enable a user (for example a clinician) to adjust, alter or select the end points of the projection vectors, for example to enable generation of rendered images which provide the most clear or clinically useful impression of the imaged volume.

According to further examples, at least a subset of projection vectors may each extend from a point not lying on the first segmented surface delimiting said sub-volume. These may extend instead between a point outside of the sub-volume, to a point inside of the sub-volume, with the point on the segmented surface intersected by each vector being assigned a surface value determined on the basis of image data values falling along the whole length of the vector.

In accordance with one or more embodiments, the surface rendering unit may be adapted to select the angle and/or length of one or more of the projection vectors such that said projection vectors intersect one or more anatomical features located within the imaged volume.

In particular examples, the surface rendering unit may further be adapted to select the angle and/or length of one or more of the projection vectors such that they intersect said anatomical feature along a particular orientational axis of the feature.

By orientational axis is meant simply a linear axis extending through a central point of said feature at a particular orientation, definable with respect to some (either pre-determined or arbitrary/notional) co-ordinate system of the volume data.

By along is meant simply parallel to, and is not intended to limit to projection vectors which exactly coincide or overlap with any given orientational axis.

The particular orientational axis which a particular projection vector follows in its intersection of the feature may be pre-defined or fixed, or alternatively may be configured to be variable in response to user-input, or in response to one or more other parameters, for example anatomical parameters determined on the basis of the segmentation.

The surface rendering unit may, in accordance with one or more non-limiting examples, be adapted to generate the surface values on the basis of one of: a maximum value, a minimum value, a sum or an average of image data values falling along the projection vectors.

The term average is to be interpreted broadly, as meaning simply a typical or representative value. It may include for example a mode, median, maximum value, minimum value, or p-percentile.

In accordance with further examples, the surface rendering unit may be adapted to generate surface values on the basis of some other, more broadly defined compositing process, to generate a composite value which provides a representation of the totality of the values in the set.

According to one or more embodiments, the segmentation unit may be adapted to identify, based on the segmentation and/or the anatomical model, a subset of the image data, representing a region of interest.

In examples, said region of interest may be the sub-volume delimited by the at least one segmented surface determined by the segmentation unit. However, the region of interest may alternatively be a smaller sub-region contained within said sub-volume, for example a region covering or containing one or more anatomical features or structures of interest within the delimited sub-volume.

According to one or more examples, the segmentation unit may be adapted to identify multiple regions of interest, some regions broader than others, including for instance one or more regions which fully or partially overlap, for example one region contained within another region. In this case a first region of interest may consist of the sub-volume delimited by the first segmented surface, and a second region of interest might be a particular anatomical feature contained within said sub-volume.

In accordance with embodiments, the surface rendering unit and the image rendering unit may be together adapted to generate images representing said region of interest.

As discussed above, the present invention provides for improved handling of 4D image data sets, comprising 3D data sets corresponding to a plurality of time-separated image frames. In particular, embodiments of the present invention may enable multiple frames to be rendered so as to maintain across each of the frames a consistent representation of view of particular anatomical features or regions of interest within the imaged volume.

Accordingly, for at least one set of embodiments, where received image data comprises data representing multiple frames captured at different points in time, the segmentation unit may be adapted to identify a common region of interest within the image data for each of said frames; and the surface rendering unit and the image rendering unit may together be adapted to generate an image for each of said frames wherein the location and/or orientation of the region of the interest within each image is substantially aligned.

By way of example, the segmentation unit may be configured to isolate the outer surface of the heart as the first segmented surface, and to further identify a particular anatomical structure forming a part of the heart as said region of interest. The beating of the heart means that both the internal and external structure of the heart changes across each beating cycle. As a result, the region of interest may, in between frames, change its (absolute) position, its outer or inner dimensions and/or its orientation relative to the outer surface of the heart.

Typically (in the prior art) such shifts may result in the representation of the region generated by the surface rendering unit on the segmented surface changing in terms of the particular view or angle at which the region is imaged. The region may appear to shift or move about on the segmented surface, or to rotate, such that a slightly different side or areas of the region is presented for view.

Furthermore, the expansion and contraction of the heart itself would typically result in the surface representations themselves shifting position between each of the rendered frames.

The example set of embodiments described above resolve these problems by enabling both the surface rendering unit and the image rendering unit to make use of image-specific anatomical information acquired by means of the segmentation and/or the anatomical model. This anatomical context information enables the respective units to compensate for these dynamical shifts, and generate final rendered images in which both the orientation and the position within the image of one or more regions of interest remains consistent across all frames. The surface rendering unit may alter the angles and/or depths of the projection vectors between frames so as to project the region of interest onto the segmented surface at a consistent angle or as though from a consistent viewpoint. The image rendering unit may be adapted to alter the notional observer viewpoint from which the segmented surface is rendered, to thereby ensure that the region of interest and/or the segmented surface itself maintains in a consistent location within the image. The image rendering unit may additionally or alternatively be configured to crop, or otherwise amend or reconfigure the composition of the final image so as to maintain consistency between frames.

Note that according to one or more examples, the region of interest may comprise a region of the first segmented surface, i.e. a two-dimensional region.

In accordance with one or more examples, the image rendering unit may be adapted to combine the images generated for the different frames into a dynamic or moving representation, wherein the location and/or orientation of the region of interest is stabilised across all frames.

However, in accordance with alternative examples, the image rendering unit may be adapted to combine the images generated for the different frames into a single static image. In this case, the image rendering unit may be adapted to form a composite image, comprising data from each of the plurality of frames, combined together to from a single amalgamated image.

In accordance with at least one set of embodiments, the surface rendering unit may be adapted to generate said one or more surface values to be assigned to said points on one or more of the at least one segmented surface also at least partly on the basis of further image data values falling within a surrounding neighbourhood of each of said points, said neighbourhood extending in directions parallel to the at least one segmented surface and/or directions having components perpendicular to the at least one segmented surface.

Each surface value may hence be determined in these cases, not only on the basis of image data values falling along the projection vectors, but also at least partly on the basis of some composite or amalgamation of image data values falling within a surrounding neighbourhood of the surface point to which the value corresponds. The neighbourhood may in examples be a purely 2D neighbourhood, extending to cover image data points in an area of the segmented surface surrounding the surface point in question. In other examples, the neighbourhood may be a 3D region extending for instance partly over an area of the segmented surface and partly into the volume beneath.

In accordance with a further aspect of the invention, there is provided an ultrasound system, comprising:

an ultrasound transducer array adapted to generate 3D ultrasound image data of a volume of an object to be imaged; and an imaging system as claimed in any preceding claim, wherein the input unit is configured to receive said 3D ultrasound image data.

In accordance with yet a further aspect of the invention, there is provided an imaging method, comprising:

obtaining 3D image data of an object to be imaged;

segmenting said 3D image data on the basis of an anatomical model and thereby determining at least one segmented surface within the 3D image data;

defining one or more projection vectors extending through one or more points on the at least one segmented surface, each projection vector having length and/or angle to the segmented surface determined at least partly on the basis of the anatomical model;

generating one or more surface values to be assigned to said points on the at least one segmented surface, said values being based upon image data values of the 3D image data falling along the lengths of the projection vectors extended through said points; and generating one or more images of the object to be imaged based upon said generated surface values.

In examples of the method, each projection vector may have length and/or angle to the segmented surface determined at least partly on the basis of the segmenting of the 3D image data. According to one or more embodiments, the method may comprise extending each of at least a subset of the projection vectors between a respective point on the segmented surface and a respective point within the imaged volume, said respective point within the imaged volume being selected at least partly on the basis of the segmenting, the anatomical model and/or on the basis of user input commands.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a 'model-based' imaging system in which surface values to be applied to a segmented surface of an imaged body are determined on the basis of projections cast into the volume of the imaged body, the projections made at angles and depths determined on the basis of information encoded within an anatomical model. In examples, the angles and depths are determined on the basis of a comprehensive segmentation of the imaged body, itself performed on the basis of the anatomical model. By locally varying projection angles and depths around the body, in dependence upon local anatomical context, improved imaging of the internal structure of the imaged body may be achieved. In particular, images may be generated providing representations of the internal structure which are of greater clinical utility or relevance. 4D data sets may also be better handled, through use of anatomical context to maintain consistency in representations across multiple frames.

Figure 1:
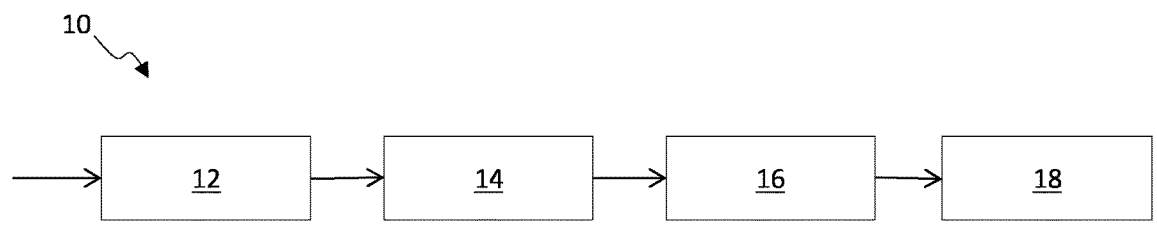
FIG. 1 schematically depicts an example imaging system in accordance with an embodiment.

FIG. 1 schematically depicts the structure of an imaging system 10 in accordance with a simple embodiment of the invention. 3D image data of a volume of an object to be imaged is received by an input unit 12. The image data is then communicated to a segmentation unit 14, which is adapted to perform segmentation of the 3D image data based upon an anatomical model, wherein this segmentation is configured to determine (or isolate) at least one segmented surface within the 3D image data. The segmented or isolated surface may be a surface of anatomical significance, such as the outer surface of an organ, or of another anatomical structure.

The segmentation unit may in examples be configured to identify a plurality of surfaces within the 3D image data and/or to identify points and regions within the data. These may correspond to anatomically significant surfaces (such as walls or boundaries) or anatomically significant points or regions.

Various model-based segmentation algorithms are known in the art, and the skilled person would be familiar with such processes. One suitable segmentation algorithm for example is described in the paper by Ecabert el al., *Automatic Model-Based Segmentation of the Heart in CT Images*, IEEE Transactions on Medical Imaging, Vol. 27, No. 9, September 2008, 1189-1201.

In examples, model-based segmentation of for example the heart may make use for instance of a 'mean' or 'average' or 'template' model of the anatomical region or feature to be segmented. This might include for instance a triangle mesh consisting of N points and T triangles connecting the points. The initial shape of this mean or template mesh describes for example an average or typical shape. The model is then adapted to a specific set of image data through a number of steps.

First, a general position and orientation for the mesh are determined or defined, and the mesh is placed accordingly within the image. Each triangle in the mesh may be pre-encoded or associated with one or more graphical patterns or features which give an indication of where the triangle should be placed within the image data. For each triangle, the segmentation unit may, after initial placing of the mesh, search for the respective encoded features within the data, and then adjust the positioning of the triangle accordingly. It may also be encoded in the model which mesh regions belong to which anatomical structures, and this may provide anatomical context for the later rendering processes, for instance the defining of the projection vector depths and angles.

The invention however is not limited to the specific methods referenced or detailed above, and these are described by way of illustration only. Other suitable segmentation algorithms may also be used.

The thus segmented data is then communicated to a surface rendering unit 16 which is configured to generate one or more surface values to be assigned to points on the at least one segmented surface. These values may in examples comprise colour, texture or shading values for instance. The values are determined on the basis of image data values falling along projection vectors extended through said points on the segmented surface, each projection vector having angle and/or length determined at least partly on the basis of the segmentation and/or the anatomical model. This may include in examples an averaging of these values, or some other compositing of the values, such as determining a maximum or minimum value.

The data now segmented and having surface values thus applied is finally communicated to an image rendering unit 18 which is configured to render the data to form one or more images of the object to be imaged, based upon the surface values generated by the surface rendering unit 16.

Figure 2:
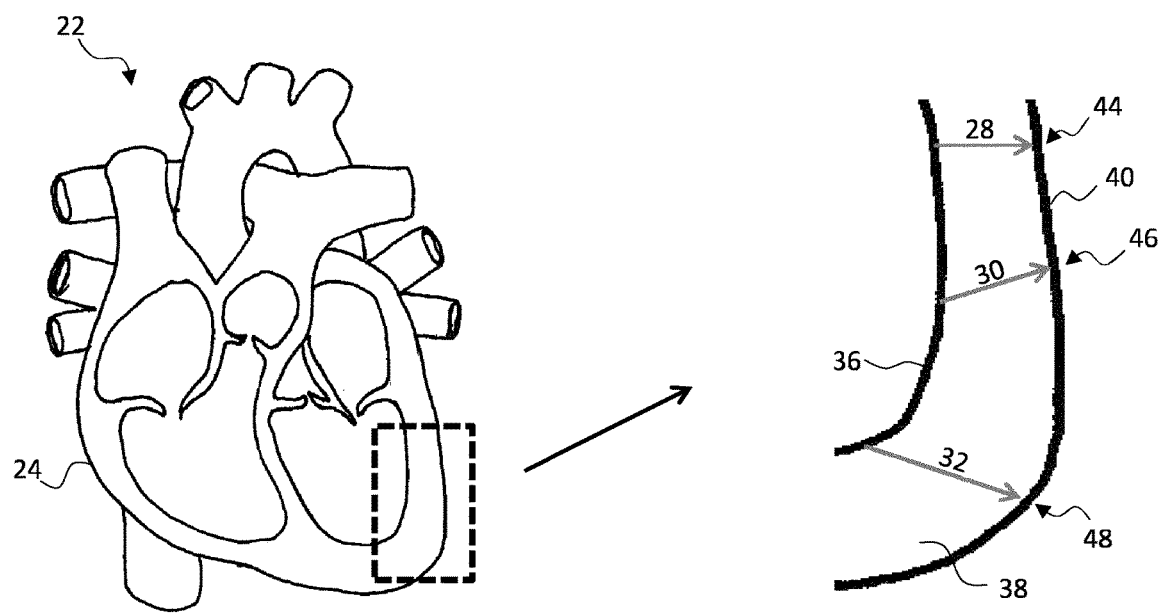
FIG. 2 schematically illustrates elements of the surface rendering process in accordance with embodiments of the invention.

In FIG. 2 is provided a simple illustration of the concept of the invention. As discussed above, in accordance with embodiments, a received 3D image data set is first segmented by the system, by means of an anatomical model of the imaged region, to thereby isolate an anatomically significant sub-volume within the imaged region, delimited by a first segmented surface. In the example illustrated by FIG. 2, the sub-volume thus isolated by the system is the volume containing the heart, with the first segmented surface therefore corresponding to the outer surface of the heart.

The left side of FIG. 2 schematically depicts a cross-section through the heart 22, whose outer surface 24 has been isolated by the imaging system. The right side of FIG. 2 depicts a small section of the wall of the left ventricle of the thus isolated heart, through which an illustrative sample of three projection vectors 28, 30, 32 are shown cast between respective points along the endocardium 36, and opposing points 44, 46, 48 on the epicardium 40. Each of the respective points on epicardium (which in this case is forming a section of the segmented outer surface isolated by the imaging system) is assigned a colour or shading value based on a compositing of image data values (i.e. voxels) falling along the length of respective projection vector intersecting it.

The colour or shading value determines the particular colour or shade which will be applied to the given point on the outer surface 24 in a final rendered image. For ease of reference, it will be assumed for the present example that the final rendered image will be rendered in grey-scale only, and hence the surface value shall be referred to as 'shading value'. However, each reference in the below descriptions to shading values is to be understood to be replaceable, without any loss of generality, with any alternative variety of surface value (such as colour value for instance).

Each shading value is determined based on a compositing of image data values falling substantially along the corresponding projection vector. It is noted that by 'along' is meant broadly in the vicinity of, and does not necessarily imply that only values directly intersected by the projection vector are composited to form the final shading value. It is further noted that in performing the compositing function to generate the shading value, supplementary values may be interpolated (or extrapolated) from captured image data values and included in the compositing. The interpolated (or extrapolated) values may be estimated values corresponding to one or more points along the length of a given projection vector not otherwise covered by values provided in the received image data.

In examples, the compositing function may comprise for instance determining a mean value, a median value, a mode value, p-percentile value, a minimum value or a maximum value. However, any suitable compositing function may in alternative examples be used.

As illustrated in the example of FIG. 2, each projection vector may typically vary in its relative length and/or angle of direction (or orientation). In particular, the angle or length is determined for each vector on the basis of one or both of: information encoded in the anatomical model and the results of the segmentation performed by the segmentation unit. Since the segmentation is itself performed based on the anatomical model, in all cases, the length and/or directions of the vectors are at least partly anatomically determined.

In the example of FIG. 2, it can be seen that the length (in correspondence with the angle) of each of the three projection vectors 28, 30, 32 has been selected so as to extend exactly between the endocardium 36 and the epicardium 40, and no further. In this case therefore, the projection vectors have each been assigned angle and length in correspondence with the locations of the endocardium and epicardium. To achieve this, the segmentation performed by the imaging system may include a process of identifying within the received image data (based on the anatomical model) contours or surfaces corresponding to each of the endocardium and epicardium. This information may then be used in defining the lengths and angles of each of the projection vectors, so as to construct vectors which extend only to the endocardium. In so doing, an image is generated providing a representation of the myocardium 38 and the surfaces of the endocardium 36 and epicardium 40, and nothing else.

The angle at which each projection vector is cast may be determined by the imaging system based upon specific information encoded in the anatomical model relating to local anatomical features or properties. The angles may be chosen for instance so as to form a projection or representation on the outer surface 24 which provides or shows a particular view or orientation of a given anatomical feature. This feature will be explained in more detail (in relation to FIG. 3) in later paragraphs.

According to particular examples, the angles and/or lengths of the projection vectors may be determined at least partly on the basis of user input commands. These user input commands may be generated by an external user interface unit, in operative communication with the imaging system, or may be generated by a user input unit forming part of an embodiment of the invention.

In examples, the user input commands may correspond to user selections of particular anatomical features or boundaries within the imaged volume to which or between which the user has indicated they would like projection vectors to be extended. In practice this may correspond to an indication of the depth within the heart (or other imaged body) to which they would like the final rendered image to provide a representation. In this case, the results of the segmentation and/or information encoded in the anatomical model may be employed in determining the precise lengths and/or angles of vectors required for each point on the outer segmented surface, in order to extend to the indicated anatomical layer or feature.

User input commands may in other examples correspond to user selections not of anatomical features, but of specific dimensional lengths or ranges across which they desire projection vectors to extend.

In examples, other factors may also be locally varied in dependence upon information contained in the anatomical model and/or upon the segmentation. For example, different compositing functions might be applied in generating shading values for different points around the outer surface 24.

Figure 3:
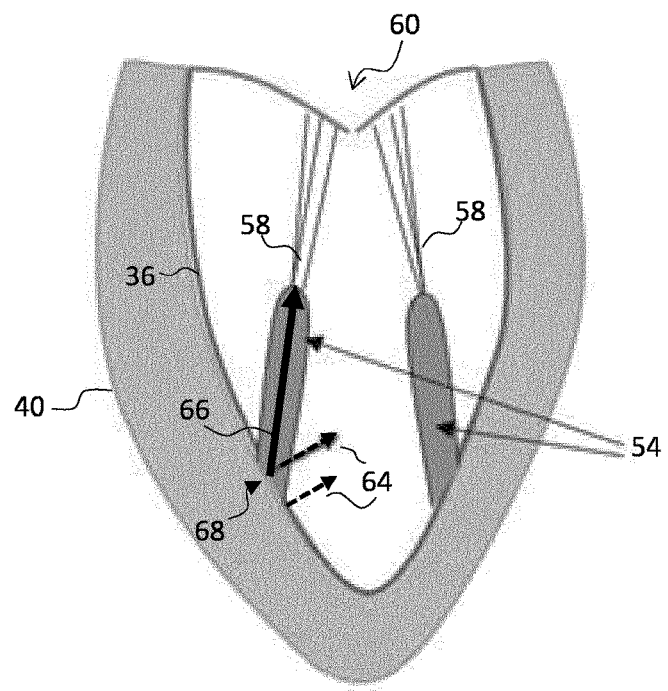
FIG. 3 schematically illustrates further aspects of the surface rendering process in accordance with embodiments of the invention.

In FIG. 3 is shown a further schematic depiction of a left ventricle of an imaged heart region 22 in which the concept of varying projection vector angles and depths in dependence upon anatomical considerations is illustrated more clearly. In this example, the imaging system is configured to generate a final rendered image of just the left ventricle. The segmentation unit is therefore configured to isolate a bounding outer surface of the left ventricle (for the present example the endocardium 36), and the surface rendering unit adapted to generate surface values to be applied to this surface.

As shown in FIG. 3, the left ventricle contains the papillary muscles 54 which are attached by the Chordae tendineae 58 in the apical region to the mitral valve 60, located across the ceiling of the ventricle. In the present example it is supposed that one wishes to image the attachment points of the papillary muscles (the points where they meet the endocardium 36). Were the projection vectors in this case all to be defined uniformly at 90 degree angles to the surface 36, (as shown by illustrative examples 64), the resulting projection generated on the surface would not provide an ideal representation of these attachment points.

Rather, as illustrated, by way of example in relation to surface point 68, the best projection vector for this point (in order to image the papillary muscle attachment points) might be the vector illustrated by arrow 66. Furthermore, by aligning all the projection vectors in this case with the natural orientational alignment of the papillary muscles, the attachment points appear as sharp and focussed (e.g. bright) spots on the surface set against a darker background, as opposed to more spread or smeared out (bright) areas on the surface, and hence the attachment points may be better visualised.

Since the tissue of the papillary muscles 54 is denser than the surrounding cavity of the left ventricle, the projection vectors which pass mainly through this tissue result in a corresponding surface value which appears brighter on the rendered surface, that in the case of vectors passing mainly through the empty space of the cavity. Hence, the papillary attachments points appear as focussed white spots on the surface set against a darker surrounding surface. There is in this case both maximised contrast, and maximised focus.

For different points around the surface, the particular angle and depth most appropriate for imaging the region or location or point of interest (in this example the attachment points of the papillary muscles) may in some cases vary. By defining each surface point's projection vector individually, in a way such that the angles and/or lengths vary depending upon the point's particular location and/or angle relative to the anatomical region or location of interest, it is possible to provide a surface projection which more clearly represents or images the underlying feature of interest.

In accordance with one set of examples, the anatomical model may be encoded with one or more sets of pre-defined projection vectors to apply to points on the isolated outer surface 24, 36, based upon their position on the surface. Each set of vectors may be specially configured for ideal surface representation of a particular anatomical feature of interest within an imaged volume. There may be encoded in each given set one projection vector for each point on a segmented outer surface. The imaging system may in accordance with these examples be configured to comprehensively segment the outer surface of the segmented sub-volume, so as to enable each voxel on the outer surface to be identified with a particular location-point on the corresponding surface encoded in the model. In this way, each point on the segmented surface may be assigned a pre-defined projection vector based upon its location on the surface.

According to even simpler examples, there may be encoded in the model particular angles and depths of projections to be applied across broad regions of the segmented outer surface. In this case, the system may be configured to segment the outer surface isolated within the data so as to identify said broad regions, and to apply projection vectors having the corresponding angles and depths. Again, different sets of angles and/or depths may be encoded within the model for each region in accordance with different anatomical features or structures of interest.

In more complex examples, the imaging system may be configured to calculate ideal projection vector angles and/or depths for each surface point in each given image independently. Here, the segmentation unit may be configured, for each individual image, to comprehensively segment the sub-volume delimited by the first segmented surface, based upon the anatomical model, and thereby generate image-specific anatomical information concerning the locations and/or dimensions of one or more anatomical features or structures within the sub-volume.

This image-specific anatomical information may then be utilised by the surface rendering unit in determining the angles and/or depths at or to which the projections are cast, so as to obtain an optimal view of the particular anatomical features of interest (as indicated by user input commands for instance, or pre-programmed) lying within the delimited sub-volume. For instance, for the example of FIG. 3, once the left ventricle region has been segmented, and the locations of the various features 54, 58, 60 identified, search directions for visualizing the papillary muscles may then be determined or defined relative to these locations. For example, by determining vectors "pointing towards the mitral valve center" or "towards the tip of the mitral valve leaflets". The correct angle for the vector may then accordingly be dynamically calculated for each segmented shape.

By constructing each vector to point to the mitral valve tips for instance, the papillary muscle attachment points are imaged with significant clarity and focus, since only projection vectors originating in close vicinity of the attachment points pass through the tissue of the papillary muscles. Remaining vectors pass almost exclusively through the ventricle cavity. Points close to the location of the attachment points will therefore appear as highlighted spots set against an otherwise almost exclusively contrasting (e.g. dark) background.

Furthermore, if visualizing different phases of the heart cycle, the optimal angle can also vary with the heart phase. When determining vectors based upon an anatomical target region (e.g. "MitralValve"), the search direction may be dynamically calculated for each heart phase. Furthermore, a non-anatomical search direction (as in the case where search directions are pre-defined) can be encoded as a function of time.

Although the example presented above in relation to FIG. 3 relates to defining the surface point projection vectors in a manner such that they vary in dependence upon a location of the point relative to a particular point or region of interest within the image data, in other examples of the system, the projection vectors may be defined so as to vary in accordance with one or more other factors.

For instance, the lengths and/or angles of the projection vectors may be defined so as to vary depending upon the respective surface point's location relative to more than one point or region of interest within the 3D image data. The locations of two or more points or regions of interest may be taken into account when determining or defining the angles and/or lengths of the projection vectors, for instance so as to obtain the best possible view of all of these points or regions. This may require balancing the priorities for clear imaging of each of the points or regions so as to obtain an optimised view of all of the points or regions.

Additionally or alternatively, in accordance with one or more examples, each surface point's projection vector may be defined at least partly on the basis of the size and/or shape of a particular region or object of interest. For instance, it may be desirable to define the angles (and/or lengths) of the projection vectors such that collectively the end points of the vectors spread across the entirety of a particular boundary of the object or region for instance. Additionally or alternatively, it may be desirable to define the projection vectors in such a way that the end points of the vectors are distributed evenly across a boundary of a region or object of interest.

In accordance with one or more examples, each surface point's projection vector may be defined so as to vary in dependence upon the location and/or orientation of a particular surface of interest within the image data. For instance, it may be desirable in accordance with one or more examples to image an interior surface of the lumen of a passageway, tract or conduit. This might, by way of example be a section of the digestive system or a section of a blood vessel for instance. In this case, the angles and/or lengths of the projection vectors may be defined so as to provide an even or consistent view of said interior surface. They may be defined such that the end points of the vectors spread evenly across the entirety of the interior surface for example. They may be defined such that the projection vectors each approach or meet the interior surface at substantially the same angle (for instance within a tolerance of 5 or 10 degrees of one another).

In accordance with one or more embodiments, the surface rendering unit may be configured to determine shading values for one or more points of the segmented surface on the basis of image data points lying within a neighbourhood surrounding said point. Said neighbourhood may extend in directions parallel to the segmented surface and/or one or more directions non-parallel with the surface. According to these embodiments, the respective surface points are assigned shading values determined from a compositing of values lying within said neighbourhood, and lying along the respective projection vector extending through said point.

In accordance with one or more embodiments, the imaging system may be configured to receive and process 4D image data: image data representing multiple individual 3D frames captured at different points in time. Unlike prior art devices, embodiments of the present invention are able to render such 4D data sets in such a way as to ensure that a particular anatomical feature or region of interest within the data set is imaged in a consistent way across all frames. In particular, embodiments are able to make use of the local anatomical information acquired by means of segmentation of each frame and/or the anatomical model so as to render the frames to compensate for any motion of the imaged body occurring in between frames, and maintain a consistent view of the feature or region of interest. This functionality is referred to in this application as 'motion compensation'.

Motion compensation of this sort may in general involve two different aspects. It may first of all involve compensation to ensure that a region of interest maintains a consistent positioning within the final rendered (2D) image for each frame. It may secondly involve compensation to ensure that a consistent view of the region of interest is projected onto the segmented surface for each frame. The former may involve for example using the results of the model-based segmentation to perform one or more simple mathematical transformations of a rendered segmented surface, to maintain a consistent overall size of the surface in rendered images. The latter may involve adjustment of projection vectors in accordance with movements of anatomical bodies, in order to maintain consistent views of the region(s) of interest.

Figure 4:
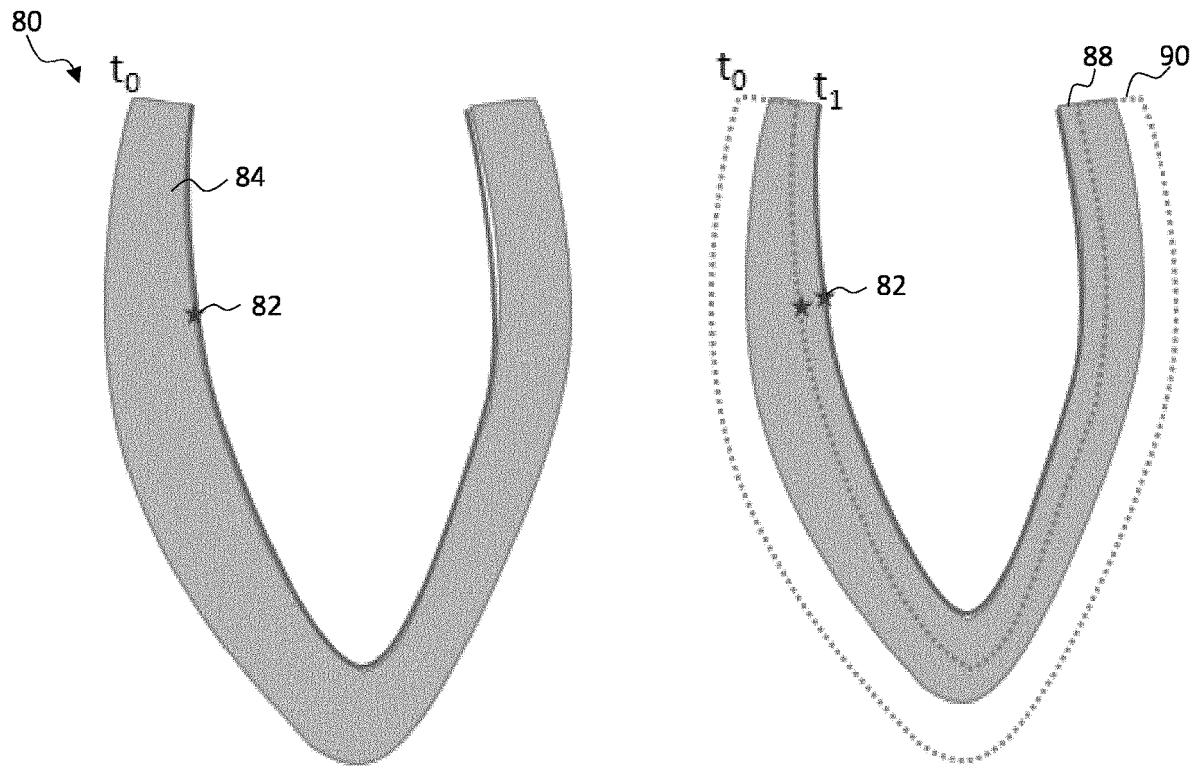
FIG. 4 schematically illustrates motion-compensation functionality in accordance with embodiments of the invention.

The concept is illustrated in relation to an example of the left ventricle in FIG. 4. For this example, it is supposed that the left ventricle 80 is the overall body which is to be imaged, and within said body, a particular point 82 shown on the ventricle wall 84 is the region or feature of interest of which it is desired to maintain a consistent view. Hence, the segmentation unit is in this case configured to identify and isolate the endocardium (the surface immediately surrounding the left ventricular cavity) within the received image data, and also thereby isolate the sub-volume containing the left ventricular cavity within the image data. The surface rendering unit is then configured to generate shading or texture values to be assigned or applied to points on this surface, on the basis of image data values along projection vectors defined extending through said points and into the volume.

The left-side image of FIG. 4 depicts the ventricle wall 84 at time at $t_0$, when the heart is in the end-diastolic (ED) phase, and the right-side image depicts the shift in the ventricle wall at time $t_1$, when the heart is in the end-systolic phase, and the left ventricle has correspondingly contracted.

As shown in FIG. 4, the contraction of the ventricle from a first form 88 at $t_0$ to a second form 90 at $t_1$ results in a shift in the position of the feature of interest 82. However, because model-based segmentation is performed for each frame individually, the movement of the region of interest need not result in a shift in the position of the region in the final image. One may simply use the anatomical context generated by the segmentation of each frame to effectively render the respective segmented surfaces for each onto the same consistent mesh.

One simple means of doing this would be to simply 'project' the smaller contracted surface values onto the same larger mesh as was used to represent the surface in the first ($t_0$) frame. Each point on the contracted surface of $t_1$ may simply be mapped onto the corresponding anatomical point of the larger mesh of $t_0$.

An alternative way of describing this approach is to say that the results of the model-based segmentation of the second frame at $t_1$ may be utilised to perform a mathematical transformation of the rendered surface of the frame at $t_1$, to enlarge it to match the size of the rendered surface for the $t_0$ frame. This may for example comprise performing one or more affine transformations.

Alternatively, more sophisticated use may be made of the anatomical context generated through segmentation. In particular, segmentation allows true local anatomical correspondence to be identified and established between regions or points on segmented surfaces of different frames. This anatomical correspondence allows image data from each frame to be rendered onto the same consistent mesh, even where there are for example local deformations in the shape, size or the contour of the surface. Mere projection of one surface onto a mesh generated for the other surface may not be able to fully compensate for such local variations or deformations. However, utilisation of anatomical correspondence may enable this to be more successfully achieved.

As will be appreciated, the contraction may typically result not just in a shift in the 'absolute' position of the feature of interest (within the image data as a whole, say), but also in a shift in the relative position of the feature 82, within the left ventricle itself. This means that there may typically be a change in the displacement of the feature of interest with respect to one or more of the points on the outer epicardium surface of the left ventricle. This means that in examples where one wishes to segment and render the epicardium surface, rather than the endocardium surface, adjustments may need to be made to the projection vectors extending through these points in order to maintain a consistent view of the region of interest. In particular, it may be necessary to vary the angle and/or direction of the projection vectors defined from/to these points in different image frames so as to compensate for the change in displacement from them of the feature 82.

This may be achieved in examples by means of determining image specific anatomical context information for each frame. This may be generated by means of the segmentation process applied to each frame individually for example, wherein not only is the outer surface of the ventricle identified and isolated by means of the process, but each point (or mesh triangle for instance) on the isolated surface is also identified in terms of its relative anatomical position on the surface. This information may then be used in accordance with one or more of the example methods described above, to project the same particular view or impression of the region of interest onto the surface for each frame.

Figure 5:
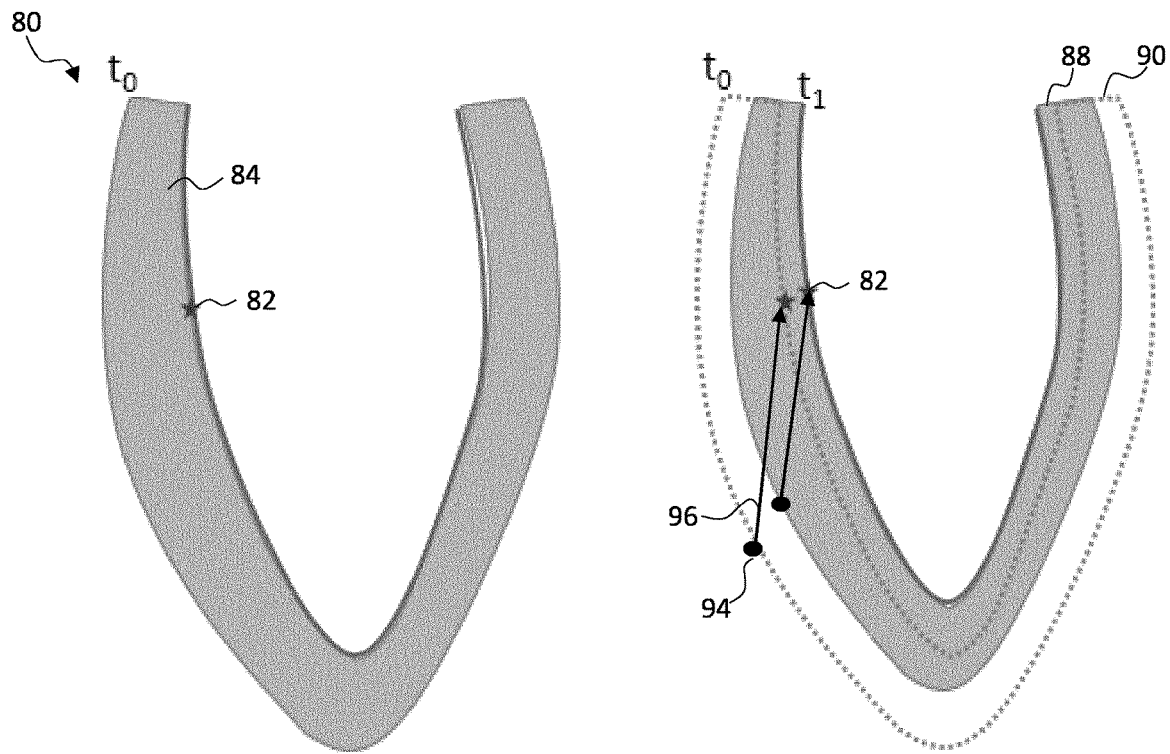
FIG. 5 provides further schematic illustration of motion-compensation functionality in accordance with embodiments of the invention.

An illustration of this concept is depicted in FIG. 5. One example projection vector 96 is shown in FIG. 5 corresponding to an example point 94 on the surface of the ventricle wall at both time $t_0$ and time $t_1$. Here, as can be seen, the ideal projection vectors respectively required to maintain the same (example) view of feature 82 are different in $t_0$ and $t_1$ both in length and also very slightly in angle. Of course, it is to be appreciated that the images shown in FIG. 4 represent only respective cross-sections of the ventricle wall, and that for other points across regions of the surface not visible, displaced from the region of interest in all three dimensions, the changes in the required projection vectors may be more pronounced.

Furthermore, in accordance with one or more examples in order to maintain a consistent view of a region or feature of interest, it may be necessary or desirable not only to vary angles and directions of projection vectors, but also to vary for each frame the notional observer 'viewpoint' from which the final image of the segmented body is rendered (by the image rendering unit). For example, in the case of the left ventricle shown in FIG. 4, the contraction of the ventricle means that, in the absence of any remedial action, the whole ventricle surface would appear in the $t_1$ rendered image slightly smaller than in the $t_0$ rendered image, and hence the representation of the feature 82 provided on the surface of the ventricle would appear to shift in position as one moved from one frame image to the next.

To compensate for this, one may apply the transformation or mapping approach outlined above, in which the surface at $t_1$ is mapped onto the same larger mesh as is used to render $t_0$. However, in accordance with one or more alternative examples, the image rendering unit may be configured to adjust the displacement of a notional observer viewpoint relative to the imaged body, so as to effectively magnify (or shrink) or rotate the imaged body between different frames, in order to maintain a consistent size and/or orientation of the imaged body (or a feature of interest).

Figure 6:
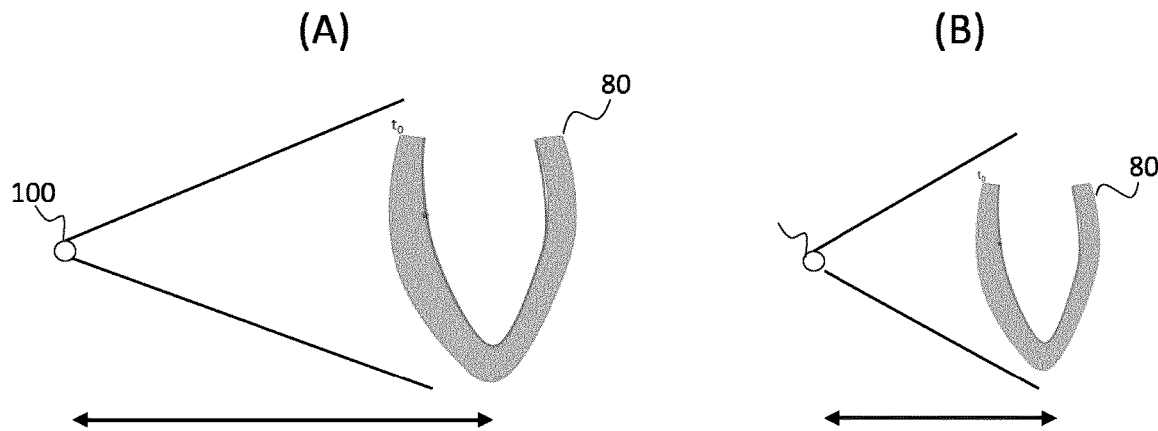
FIG. 6 schematically illustrates a notional observer viewpoint at a different distance to the left ventricle in (expanded) end-diastolic phase (A) and also in (contracted) end-systolic phase (B)

This is illustrated schematically in FIG. 6, which depicts the left ventricle 80 in (expanded) end-diastolic phase (A) and also in (contracted) end-systolic phase (B). The respective images show how a notional observer viewpoint 90 may be moved closer or further from the segmented (isolated) body-to-be-imaged so to as to ensure that in the respectively final rendered images, the apparent size of the body remains consistent.

The imaging system, in accordance with embodiments, may be configured in the above described ways (or according to alternative methods) to generate, for a given 4D data set (a set 3D image data frames), a set of 2D rendered images representing an imaged volume, providing a consistent view or representation of one or more features of interest within or about said imaged volume. The image rendering unit may further be configured to compile or composite said set of individual image frames, so as to provide a single graphical representation of the whole or a part of the 4D data set.

In examples, the image rendering unit may be configured to compile said frames into a moving image, to form a film or movie-type representation of the data. By virtue of the motion compensation processes described above, such a film may effectively provide an image of the captured organ or body in which the outer structure or frame remains static, but wherein the surface of the body shifts and changes in time to reflect the changes in the appearance or properties of the volume beneath. This may make it easier for a clinician to concentrate on a particular region or feature of interest, because he or she does not have to follow the rendered position of the feature or region during the cycle. In the particular example of ultrasound imaging of the heart for instance, this approach can be used for normal echo intensities, but also for perfusion imaging, e.g. in cases when micro-bubbles are used to create an intensity-level over time that allows estimations to be made of local perfusion levels.

According to alternative examples, the image rendering unit may be configured to compile the plurality of rendered frames to form a single, composited static image. In examples, this may comprise simply superposing the rendered images for each frame, to form a single final image, or may comprise a more sophisticated compositing process, involving for example determining from the multiple frames a time-averaged shading value for each point on the imaged volume's surface.

In accordance with one or more examples, the imaging system may be configured to perform real-time rendering of images, wherein 4D image data is provided on a continual basis to the imaging system (comprising 3D image frames provided at regularly spaced intervals). This data may be provided by a separate image generation apparatus, such as an ultrasound probe for instance, to which the imaging system is operatively coupled. According to these examples, the imaging system may be configured to receive each frame from the ultrasound probe, to process it in accordance with the methods described above, and to then output the rendered 2D image onto a display unit for observation by for example a clinician.

In these examples, the imaging system may maintain consistency in the generated view of anatomical features or regions of interest in the same manner as described above. However, rather than processing all of the images in one bundle, and then outputting them together as single dynamic or static representation, instead, each frame is rendered in real time and output individually before the next frame is subsequently processed.

Alternatively, image data may not be rendered in real time, but rather rendered subsequent to capturing of images, during a later secondary process. A clinician may then view the images at leisure, without the time pressures of real-time monitoring.

Although examples of the invention have been described above in relation to visualisation of regions of the heart specifically, these examples are provided by way of illustrative example only and are in no way intended to limit the scope of application of the invention. The concepts of the invention may be applied broadly to the imaging of any object to be imaged on the basis of an anatomical model. This may relate in particular examples to the imaging of other anatomical structures within the human or animal body such a blood vessel, a lung, a kidney, a bladder, a uterus or any other organ, portion of an organ or other anatomical structure.

Various methods exist for rendering surfaces within 3D image data sets which may be consistent with embodiments of the present invention. In accordance with at least one set of examples, the surface rendering unit is configured to construct a mesh to represent or match onto the segmented outer surface isolated by the segmentation unit. Such a mesh may typically be modelled as a mesh of interlocking triangles, which are sculpted to form an approximately smooth outer surface structure. In examples, a single shading or colour value may be assigned to each triangle, or each triangle (or a sub-set of the triangles) may be divided into a plurality of regions, each of which is assigned an individual shading value.

In accordance with these examples the mesh triangles play the role of the 'surface points' referred to in the descriptions above. In each of the above described embodiments and examples, it is to be understood that reference to surface 'points' does not necessarily limit to one-dimensional, point-like surface elements, but may refer to any shape or size of 2D region of the surface, including by way of the present example, a triangle.

Continuing with the present example, each (2D) mesh triangle may cover a plurality of image data voxels within the 3D image data. In this case, a corresponding shading value for said triangle may be determined on the basis of a compositing of image data points across the whole triangular cross-section. The triangular cross-section may also be projected downward into the volume, along the direction of the corresponding projection vector for the triangle, to form a projection 'shaft'. The surface value may be determined on the basis of a compositing of image data values lying within said shaft. In further examples, said shaft may comprise any regular or irregular cross-section, for instance cylindrical, rectangular, or any other polygonal shape for instance.

In accordance, with these examples, when processing a 4D data set, the image rendering unit may be configured to render the images as a movie sequence (as described above), displayed as either a dynamic mesh (that is a mesh that changes expansion and shape faithfully with the changing cycles of the organ being imaged) or as a static mesh (that is a mesh whose surface appearance changes in accordance with the changing properties of the volume beneath, but whose extension and shape remains fixed).

Various methods exist for rendering 2D images from a segmented surface relief formed from a 3D image data set. These include, by way of illustration only ray casting, ray tracing, maximum intensity projection, scanline rendering and rasterisation.

Taking ray casting purely as an example, the present invention may be combined with the latter steps of a conventional volume ray casting process. In conventional ray casting, rays are cast from a notional observer viewpoint through the surface of an imaged volume, and composited surface values are generated based on this, to be applied to said surface. In embodiments of the present invention, surface values are generated by means of the processes described above, and hence a method more akin to 2D (surface) ray casting may be applied, wherein rays are cast from an observer viewpoint to the now partially rendered surface, and final image pixel values generated on the basis of these values in combination with one or more other scene or image parameters, such as lighting location etc.

In accordance with one or more embodiments, final rendered images may provide an 'unfolded' or flat representation of the image data, in which the segmented outer surface isolated by the segmentation unit, and the corresponding surface values generated for points on its surface, are mapped onto a flat 2D plane. Due to the non-uniform, or asymmetric shape of the surface of many organs (for example the heart), which may include multiple junctions between chambers and tubes, in many cases a planar mapped representation may be preferable in terms of clarity and ease of use. Such a representation may be particularly useful for imaging sub-regions of for example the heart (e.g. the ventricular septum), where there are multiple T-junctions.

All of the above described embodiments may be applied to 3D image data generated by any means. This may include, by way of example only, ultrasound image data, magnetic resonance image data or computer assisted tomography (CAT) image data.

Figure 7:
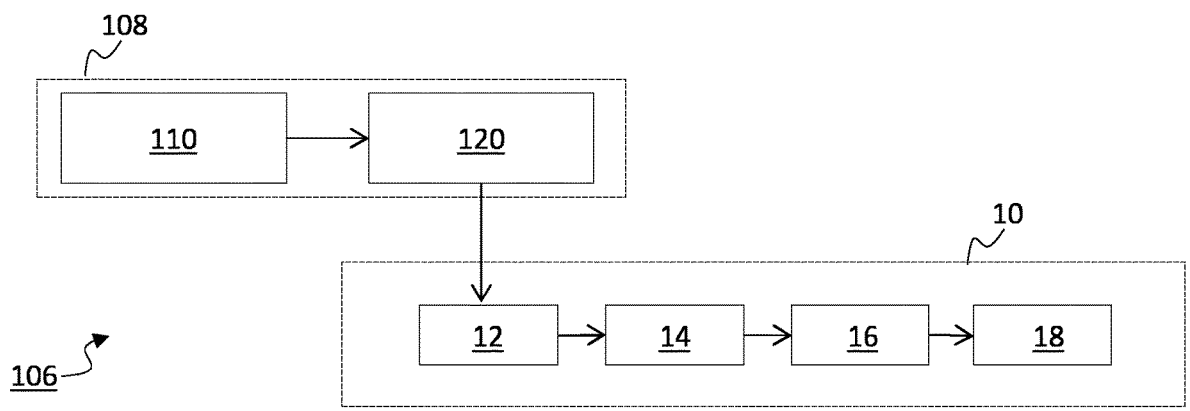
FIG. 7 schematically depicts an example ultrasound imaging system in accordance with embodiments of the invention.

According to one aspect of the invention, a schematic illustration of which is provided in FIG. 7, there is provided an ultrasound imaging system 106, comprising an ultrasound image generation unit 108 and an imaging system 10 in accordance with any described embodiment or example above. The ultrasound image generation unit 108 comprises an ultrasound transducer array 110, for example mounted in an ultrasound probe, for transmitting ultrasonic waves and receiving echo information. In examples, the transducer array may alternatively comprise piezoelectric transducer elements formed of materials such as PZT or PVDF. The transducer array may be a one or two-dimensional array of transducer elements capable of scanning in three dimensions to generate 3D image data.

In addition to the ultrasound probe, a signal processing unit 120 is provided as part of the ultrasound image generation unit 108 to process received echo data and form 3D image data which may then be provided to the imaging system 10 for processing to form rendered 2D images.

The invention has a multitude of potential applications, but may be usefully applied for example in medical diagnostic applications, such as (by way of illustration only) transthoracic echocardiogram (TTE) and diagnostic transesophageal echocardiography (TEE). It may be also be applied for interventional TEE.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An imaging system comprising:
    an input unit adapted to receive 3D image data of a volume of an object to be imaged;
    a segmentation unit adapted to perform segmentation of the 3D image data received by the input unit, the segmentation being based upon an anatomical model and configured to determine at least one segmented surface within the 3D image data;
    a surface rendering unit, adapted to generate one or more surface values to be assigned to points on the at least one segmented surface, said values being based upon image data values of the 3D image data falling along projection vectors extended through said points, each projection vector having length or angle to the segmented surface determined at least partly on the basis of the anatomical model; and
    an image rendering unit adapted to generate one or more images of the object to be imaged based upon the surface values generated by the surface rendering unit.

2. An imaging system as claimed in claim 1, wherein one or more of the projection vectors has length or angle to the segmented surface determined at least partly on the basis of the segmentation.

3. An imaging system as claimed in claim 1, wherein said surface values comprise colour, shading, texture or intensity values.

4. An imaging system as claimed in claim 1, wherein at least a subset of said projection vectors each extend from a respective point on the at least one segmented surface to a respective point within the imaged volume, said respective point within the imaged volume being selected by the surface rendering unit at least partly on the basis of the segmentation, the anatomical model or on the basis of user input commands.

5. An imaging system as claimed in claim 1, wherein the surface rendering unit is adapted to select the angle and length of one or more of the projection vectors such that said projection vectors intersect one or more anatomical features located within the imaged volume.

6. An imaging system as claimed in claim 5, wherein the surface rendering unit is adapted to select the angle and length of one or more of the projection vectors such that they intersect said anatomical feature along a particular orientational axis of the feature.

7. An imaging system as claimed in claim 1, wherein the surface rendering unit is adapted to generate said surface values on the basis of one of: a maximum value, a minimum value, a sum or an average of image data values of the 3D image data falling along the projection vectors.

8. An imaging system as claimed in claim 1, wherein the segmentation unit is adapted to identify, based on the segmentation or the anatomical model, a subset of the image data, representing a region of interest.

9. An imaging system as claimed in claim 8, wherein the surface rendering unit and the image rendering unit are together adapted to generate images representing said region of interest.

10. An imaging system as claimed in claim 8, wherein the image data comprises data representing multiple frames captured at different points in time, and wherein:
the segmentation unit is adapted to identify a common region of interest within the image data for each of said frames; and
the surface rendering unit and the image rendering unit are together adapted to generate an image for each of said frames wherein the location or orientation of the region of the interest within each image is substantially aligned.

11. An imaging system as claimed in claim 10, wherein the image rendering unit is adapted to combine the images generated for the different frames into a dynamic or moving representation, wherein the location or orientation of the region of interest is stabilised across all frames.

12. An imaging system as claimed in claim 1, wherein the surface rendering unit is adapted to generate said one or more surface values to be assigned to said points on one or more of the at least one segmented surface also at least partly on the basis of further image data values falling within a surrounding neighbourhood of each of said points, said neighbourhood extending in directions parallel to the at least one segmented surface or directions having components perpendicular to the at least one segmented surface.

13. An ultrasound system, comprising:
an ultrasound transducer array adapted to generate 3D ultrasound image data of a volume of an object to be imaged; and
an imaging system as claimed in claim 1, wherein the input unit is configured to receive said 3D ultrasound image data.

14. An imaging method, comprising:
obtaining 3D image data of an object to be imaged;
segmenting said image data on the basis of an anatomical model and thereby determining at least one segmented surface within the 3D image data;
defining one or more projection vectors extending through one or more points on the at least one segmented surface, each projection vector having length or angle to the segmented surface determined at least partly on the basis of the anatomical model;
generating one or more surface values to be assigned to said points on the at least one segmented surface, said values being based upon image data values of the 3D image data falling along the lengths of the projection vectors extended through said points; and
generating one or more images of the object to be imaged based upon said generated surface values.

15. An imaging method as claimed in claim 14, comprising extending each of at least a subset of the projection vectors from a respective point on the segmented surface to a respective point within the imaged volume, said respective point within the imaged volume being selected at least partly on the basis of the segmenting, the anatomical model or on the basis of user input commands.

16. An imaging system as claimed in claim 10, wherein the image rendering unit is adapted to combine the images generated for the different frames into a single static image.

* * * * *